US012771732B2

United States Patent
Zhu et al.

(12) United States Patent
(10) Patent No.: US 12,771,732 B2
(45) Date of Patent: Oct. 20, 2026

(54) METHOD AND APPARATUS FOR SERVICE MANAGEMENT

(71) Applicant: Telefonaktiebolaget LM Ericsson (publ), Stockholm (SE)

(72) Inventors: Jinyin Zhu, Shanghai (CN); Chunmiao Liu, Shanghai (CN); Juying Gan, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 309 days.

(21) Appl. No.: 18/273,184

(22) PCT Filed: Jan. 18, 2022

(86) PCT No.: PCT/CN2022/072537

§ 371 (c)(1),
(2) Date: Jul. 19, 2023

(87) PCT Pub. No.: WO2022/156676

PCT Pub. Date: Jul. 28, 2022

(65) Prior Publication Data

US 2024/0107384 A1 Mar. 28, 2024

(30) Foreign Application Priority Data

Jan. 20, 2021 (WO) ................ PCT/CN2021/072901

(51) Int. Cl.
*H04L 65/1016* (2022.01)
*H04W 36/00* (2009.01)

(52) U.S. Cl.
CPC ... *H04L 65/1016* (2013.01); *H04W 36/00226* (2023.05)

(58) Field of Classification Search
CPC ............. H04L 65/1016; H04L 65/1073; H04L 65/1104; H04L 65/80; H04W 36/00226;
(Continued)

(56) References Cited

U.S. PATENT DOCUMENTS 11,064,388 B2 * 7/2021 Kim ...................... H04M 15/66
11,470,526 B2 10/2022 Ke et al.
(Continued)

FOREIGN PATENT DOCUMENTS

CN 110049481 A 7/2019
CN 110831257 A 2/2020
(Continued)

OTHER PUBLICATIONS

3rd Generation Partnership Project; Technical Specification Group Services and System Aspects; Procedures for the 5G System (5GS); Stage 2 (Release 16) (Year: 2020).*
(Continued)

*Primary Examiner* — Andrew W Chriss
(74) *Attorney, Agent, or Firm* — Sage Patent Group

(57) ABSTRACT

Various embodiments of the present disclosure provide methods and apparatuses for service management. A method performed by a session management function includes receiving a first message including fallback information for a terminal device from an access and mobility management function. The fallback information includes a fallback type. The method further includes determining whether data buffering for the terminal device is required based on the fallback information. The method further includes, in response to a determination that the data buffering for the terminal device is required, sending a second message including a buffering indication to a user plane function, wherein the buffering indication indicates the user plane function to buffer the data for the terminal device.

20 Claims, 13 Drawing Sheets

(58) Field of Classification Search
CPC ..... H04W 76/30; H04W 76/20; H04W 36/02; H04W 36/023
See application file for complete search history.

(56) References Cited

U.S. PATENT DOCUMENTS

| | | | | |
|---|---|---|---|---|
| 2018/0199398 | A1* | 7/2018 | Dao | H04L 67/14 |
| 2019/0200414 | A1* | 6/2019 | Abraham | H04W 76/27 |
| 2019/0335534 | A1* | 10/2019 | Atarius | H04L 65/1016 |
| 2020/0383010 | A1 | 12/2020 | Zhu et al. | |
| 2021/0007030 | A1* | 1/2021 | Huang | H04W 36/00226 |
| 2021/0014742 | A1* | 1/2021 | Wang | H04W 36/0027 |
| 2021/0392519 | A1* | 12/2021 | Yao | H04W 76/18 |
| 2021/0410059 | A1* | 12/2021 | Talebi Fard | H04W 40/02 |
| 2022/0022102 | A1* | 1/2022 | Talat | H04W 36/144 |
| 2022/0304093 | A1* | 9/2022 | Kim | H04W 76/19 |
| 2023/0056120 | A1* | 2/2023 | Fu | H04W 24/04 |
| 2023/0224768 | A1* | 7/2023 | Xu | H04W 36/0085 370/331 |
| 2023/0292399 | A1* | 9/2023 | Velev | H04W 76/36 |
| 2023/0319687 | A1* | 10/2023 | Kim | H04W 48/08 370/329 |

FOREIGN PATENT DOCUMENTS

| | | | | |
|---|---|---|---|---|
| CN | 113709903 | A | 11/2021 | |
| EP | 3462776 | A1 * | 4/2019 | H04W 76/12 |
| WO | 2020160177 | A1 | 8/2020 | |
| WO | 2020190875 | A1 | 9/2020 | |

OTHER PUBLICATIONS

Extended European Search Report, European Patent Application No. 22742155.9, mailed Oct. 22, 2024, 12 pages.

International Search Report and Written Opinion of the International Searching Authority, PCT/CN2022/072537, mailed Mar. 30, 2022, 10 pages.

ZTE, "Clarification on the EPS fallback reporting," SA-WG2 Meeting #S2-136, S2-1911157, Reno, Nevada, USA, Nov. 18-22, 2019, 4 pages.

3GPP TS 38.413 v16.3.0 (Sep. 2020); 3rd Generation Partnership Project; Technical Specification Group Radio Access Network; NG-RAN; NG Application Protocol (NGAP) (Release 16), 411 pages.

3GPP TS 23.502 v16.6.0 (Sep. 2020); 3rd Generation Partnership Project; Technical Specification Group Services and System Aspects; Procedures for the 5G System (5GS); Stage 2 (Release 16), 597 pages.

3GPP TS 23.502 V16.7.1, "3rd Generation Partnership Project; Technical Specification Group Services and System Aspects; Procedures for the 5G System (5GS); Stage 2 (Release 16)," (Jan. 2021) 597 pages.

Ericsson, "Update to Emergency Services Fallback," S2-2000171, 3GPP TSG SA WG2 Meeting #136AH, Jan. 13-17, 2020, Incheon, KR, 14 pages.

* cited by examiner

METHOD AND APPARATUS FOR SERVICE MANAGEMENT

CROSS REFERENCE TO RELATED APPLICATIONS

This application is a 35 U.S.C. § 371 national stage application of PCT International Application No. PCT/CN2022/072537 filed on Jan. 18, 2022, which in turn claims foreign priority to International Patent Application No. PCT/CN2021/072901, filed on Jan. 20, 2021, the disclosures and content of which are incorporated by reference herein in their entirety.

FIELD OF THE INVENTION

The present disclosure generally relates to communication networks, and more specifically, to method and apparatus for service management.

BACKGROUND

This section introduces aspects that may facilitate a better understanding of the disclosure. Accordingly, the statements of this section are to be read in this light and are not to be understood as admissions about what is in the prior art or what is not in the prior art.

Communication service providers and network operators have been continually facing challenges to deliver value and convenience to consumers by, for example, providing compelling network services and performance. With the rapid development of networking and communication technologies, wireless communication networks such as long-term evolution (LTE)/fourth generation (4G) network and new radio (NR)/fifth generation (5G) network are expected to achieve high traffic capacity and end-user data rate with lower latency. To meet the diverse requirements of new services across a wide variety of industries, the 3rd generation partnership project (3GPP) is developing various network function services for various communication networks.

The Internet protocol (IP) Multimedia subsystem (IMS) is specified in 3GPP TS 23.228 V16.6.0, the disclosure of which is incorporated by reference herein in their entirety. The IP multimedia core network (IM CN) subsystem enables operators to offer their subscribers multimedia services. The IM CN subsystem may enable the convergence of, and access to, voice, video, messaging, data and web-based technologies for the wireless and wireline user. The complete solution for the support of IP multimedia applications may include terminals, IP-Connectivity Access Networks (IP-CAN), and the specific functional elements of the IM CN subsystem as described in 3GPP TS 23.228 V16.6.0. Examples of IP-Connectivity Access Network are: the GPRS (General Packet Radio Service) core network with GERAN (GSM (Global System for Mobile communications) EDGE (Enhanced Data rates for GSM Evolution) Radio Access Network) and/or UTRAN (Universal Terrestrial Radio Access Network) radio access networks; and EPC (Evolved Packet Core) core network and E-UTRAN (Evolved UTRAN) radio access network; and 5GS (5G system) access network.

Clause 5.16.3.10 of 3GPP TS 23.501 V16.7.0, the disclosure of which is incorporated by reference herein in their entirety, describes IMS Voice Service via EPS (Evolved Packet System) Fallback or RAT (Radio Access Technology) fallback in 5GS (5G system).

In order to support various deployment scenarios for obtaining IMS voice service, the UE and NG-RAN may support the mechanism to direct or redirect the UE from NG-RAN (next generation-radio access network) either towards E-UTRA (Evolved Universal Terrestrial Radio Access) connected to 5GC (5G core network) (RAT fallback) or towards EPS (E-UTRAN (Evolved Universal Terrestrial Radio Access Network) connected to EPC (Evolved Packet Core) System fallback).

Following principles apply for IMS Voice Service:

The serving AMF (access and mobility management function) indicates toward the UE (user equipment) during the Registration procedure that IMS voice over PS (Packet Switched) session is supported.

If a request for establishing the QoS (quality of service) flow for IMS voice reaches the NG-RAN, the NG-RAN responds indicating rejection of the establishment request and the NG-RAN may trigger one of the following procedures depending on UE capabilities, N26 availability, network configuration and radio conditions:

Redirection to EPS;

Handover procedure to EPS;

Redirection to E-UTRA connected to 5GC; or

Handover to E-UTRA connected to 5GC.

According to 3GPP TS 38.413 V16.4.0, the disclosure of which is incorporated by reference herein in their entirety, the NG-RAN sends the same cause "IMS voice EPS fallback or RAT fallback triggered" for any of the above reasons. For example, upon reception of the PDU SESSION RESOURCE MODIFY REQUEST message to setup a QoS flow for IMS voice, if the NG-RAN node is not able to support IMS voice, the NG-RAN node shall initiate EPS fallback or RAT fallback for IMS voice procedure as specified in 3GPP TS 23.501 V16.7.0 and report unsuccessful establishment of the QoS flow in the PDU Session Resource Modify Response Transfer IE (information element) or in the PDU Session Resource Modify Unsuccessful Transfer IE with cause value "IMS voice EPS fallback or RAT fallback triggered".

FIG. 1 shows an EPS Fallback for IMS voice, which is same as FIG. 4.13.6.1-1 of 3GPP TS 23.502 V16.7.1, the disclosure of which is incorporated by reference herein in their entirety. For some steps of FIG. 1 which have been described in clause 4.13.6.1 of 3GPP TS 23.502 V16.7.1, the description thereof is omitted here for brevity.

At step 4. NG-RAN responds indicating rejection of the PDU (protocol data unit) Session modification to setup QoS flow for IMS voice received in step 2 by PDU Session Modification Response message towards the SMF+PGW-C (packet data network gateway control plane function) (or H-SMF (Home SMF)+P-GW-C via V-SMF (visited SMF), in the case of home routed roaming scenario) via AMF with an indication that mobility due to fallback for IMS voice is ongoing. The SMF+PGW-C maintains the PCC (Policy and Charging Control) rule(s) associated with the QoS Flow(s) and reports the EPS Fallback event to the PCF (Policy Control Function) if PCF has subscribed to this event.

At step 5. NG-RAN initiates either handover (see clause 4.11.1.2.1 of 3GPP TS 23.502 V16.7.1), or AN Release via inter-system redirection to EPS (see clause 4.2.6 and clause 4.11.1.3.2), taking into account UE capabilities. The SMF+PGW-C reports change of the RAT type if subscribed by PCF as specified in clause 4.11.1.2.1 of 3GPP TS 23.502 V16.7.1, or clause 4.11.1.3.2.6 of 3GPP TS 23.502 V16.7.1. When the UE is connected to EPS, either step **6*a* or step 6*b*** is executed.

FIG. 2 shows a RAT Fallback for IMS voice, which is same as FIG. 4.13.6.2-1 of 3GPP TS 23.502 V16.7.1, the disclosure of which is incorporated by reference herein in their entirety. For some steps of FIG. 2 which have been described in clause 4.13.6.2 of 3GPP TS 23.502 V16.7.1, the description thereof is omitted here for brevity.

At step 4. Source NG-RAN responds indicating rejection of the PDU Session modification to setup QoS flow for IMS voice received in step 2 by PDU Session Response message towards the SMF (or V-SMF, in the case of roaming scenario) via AMF with an indication that mobility due to fallback for IMS voice is ongoing. The SMF maintains the PCC rule(s) associated with the QoS Flow(s).

At step 5. Source NG-RAN initiates Xn based Inter NG-RAN handover (see clause 4.9.1.2 of 3GPP TS 23.502 V16.7.1) or N2 based inter NG-RAN handover (see clause 4.9.1.3 of 3GPP TS 23.502 V16.7.1), or redirection to E-UTRA connected to 5GC (see clause 4.2.6 of 3GPP TS 23.502 V16.7.1). The SMF reports change of the RAT type if subscribed by PCF.

FIG. 3 shows an AN (access network) release procedure, which is same as FIG. 4.2.6-1 of 3GPP TS 23.502 V16.7.1, the disclosure of which is incorporated by reference herein in their entirety. For some steps of FIG. 3 which have been described in clause 4.2.6 of 3GPP TS 23.502 V16.7.1, the description thereof is omitted here for brevity.

At step 6*a*, SMF (session management function) may send an N4 Session Modification Request (AN or N3 UPF Tunnel Info to be removed, Buffering on/off) to UPF (User plane Function).

For PDU Sessions not using Control Plane CIoT (Cellular IoT (Internet of Things)) 5GS Optimization, the SMF initiates an N4 Session Modification procedure indicating the need to remove Tunnel Information of AN or UPF terminating N3. Buffering on/off indicates whether the UPF shall buffer incoming DL (downlink) PDU or not.

If the SMF has received an indication from the AMF that the UE is not reachable for downlink data for PDU Sessions using Control Plane CIoT 5GS Optimisation, the SMF may initiate an N4 Session Modification procedure to activate buffering in the UPF.

If multiple UPFs are used in the PDU Session and the SMF determines to release the UPF terminating N3, step 6*a* is performed towards the UPF (e.g. PSA (PDU Session Anchor)) terminating N9 towards the current N3 UPF. The SMF then releases the N4 session towards the N3 UPF (the N4 release is not shown on the call flow).

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

With existing UPF buffering solution as shown in FIG. 3, there is a short packet loss window.

FIG. 4 shows an example of packet loss window in existing UPF buffering solution for EPS fallback via redirection. The SIP (session initiation protocol) DL (downlink) signaling loss may cause SIP signaling retransmission. The messages as shown in FIG. 4 are same or similar as the corresponding messages as described in various 3GPP specifications such as 3GPP TS 23.502 V16.7.1, 3GPP TS 23.501 V16.7.1, 3GPP TS 38.413 V16.4.0, etc.

At step 1, AMF may send a PDU Session Resource Modify Request (5QI (5G QoS Identifier)=voice) to (R)AN. NGAP denotes Next Generation Application Protocol.

After receiving the PDU Session Resource Modify Request, RAN may decide to trigger EPS-FB (fallback) with RwR (Release with Redirection) and select target frequency (blind or measurements based)

At step 2, (R)AN may send a PDU Session Resource Modify Response (Fail, cause with IMS voice fallback) to AMF.

At step 3, (R)AN may send an AN (access network) Connection Release request to the UE. The UE may send a UE low layer Confirmation to (R)AN.

At step 4, AMF may send an Nsmf_PDUSession_UpdateSMContext((Fail, cause with IMS voice fallback) request to SMF.

At step 5, (R)AN may send a N2 UE Context Release Request to AMF.

At step 6, AMF may send a N2 UE Context Release Command to (R)AN.

At step 7, (R)AN may send a N2 UE Context Release Complete to AMF.

At step 8, AMF may send Nsmf_PDUSession_UpdateSMContext to SMF.

At step 9, SMF may send a N4 Session Modification Request (Buffering on) to UPF. After receiving the N4 Session Modification Request (Buffering on), UPF buffering starts.

At step 10, (R)AN may send a N4 Session Modification Response to SMF.

At step 11, SMF may send a Nsmf_PDUSession_UpdateSMContext Response to AMF.

The delays values as shown in FIG. 4 are estimated values rather than measured values. If a DL SIP message is sent from P-CSCF (proxy call serving call control function (P-CSCF)) while the packet loss window occurs, the DL SIP message is lost. This triggers the SIP TCP (transmission control protocol) or UDP (user datagram protocol) retransmission, which may lead to additional CST (Call Setup Time) delays.

FIG. 5 shows an example of long retransmission causing call setup delay. The messages as shown in FIG. 5 are same or similar as the corresponding messages as described in various SIPs such as Request for Comments (RFC) 3261, etc. As shown in FIG. 5, delayed UPF buffering may cause TCP retransmission, i.e., message 27 is lost. For SIP over TCP, the TCP first retransmission may delay for about 3 seconds (message 28 is sent after QCI (QoS Class Identifier)-5 setup in EPS).

The TCP RTO (Retransmittion Timeout) may be calculated dynamically for example according to the standard of https://tools.ietf.org/html/rfc6298 based on the RTT (round-trip time) of the TCP segments. Unfortunately, when the terminating UE is in a not connected state, the paging process may delay smaller than 1.2 seconds, e.g., four TCP segments (one for OPTIONS and 3 for INVITE). Therefore, the RTO is increased. This long RTO may cause that the TCP first retransmission may delay for about 3 seconds (message 28 is sent after QCI-5 setup in EPS).

In addition, for fallback via handover with direct/indirect forwarding tunnel support, the early buffering as shown in step 6*a* of FIG. 3 may delay call setup since without early buffering, the data such as SIP signaling still can be transferred to the UE.

To overcome or mitigate at least one of above mentioned problems or other problems, the embodiments of the present disclosure propose an improved solution of service management, which can optimize the service handling such as avoiding signaling or data loss and/or decreasing the call setup time.

According to a first aspect of the present disclosure, there is provided a method performed by a session management function. The method comprises receiving a first message including fallback information for a terminal device from an access and mobility management function. The fallback information comprises a fallback type. The method further comprises determining whether data buffering for the terminal device is required based on the fallback information. The method further comprises, in response to a determination that the data buffering for the terminal device is required, sending a second message comprising a buffering indication to a user plane function. The buffering indication indicates the user plane function to buffer the data for the terminal device.

In an embodiment, the fallback type comprises at least one of redirection; or handover.

In an embodiment, determining whether data buffering for the terminal device is required based on the fallback information comprises: when the fallback type is redirection, determining that the data buffering for the terminal device is required.

In an embodiment, determining whether data buffering for the terminal device is required based on the fallback information comprises: when the fallback type is handover, determining that the data buffering for the terminal device is not required.

In an embodiment, the redirection comprises at least one of: redirection to a first network from a second network; or redirection to the first network connected to a core network of the second network.

In an embodiment, the handover comprises at least one of: handover to a first network from a second network; or handover to the first network connected to a core network of the second network.

In an embodiment, the first network comprises an evolved packet system (EPS) and the second network comprises a fifth generation system.

In an embodiment, the fallback comprises at least one of evolved packet system (EPS) fallback or radio access technology (RAT) fallback.

In an embodiment, the fallback is related to Internet protocol multimedia subsystem, IMS, service.

In an embodiment, the session management function comprises a packet data network gateway control plane function (PGW-C) combined with a session management function (SMF).

In an embodiment, the first message comprises an Nsmf_PDUSession_UpdateSMContext Request message with N2 PDU Session Resource Modify Response Transfer or PDU Session Resource Modify Unsuccessful Transfer.

In an embodiment, the second message comprises an N4 Session Modification Request message.

In an embodiment, the second message is sent during or before an access network release procedure.

In an embodiment, when the buffering indication is sent before the access network release procedure, the buffering indication has a higher priority than a buffering indication sent during the access network release procedure.

According to a second aspect of the present disclosure, there is provided a method performed by an access and mobility management function. The method comprises receiving a third message including fallback information for a terminal device from a radio access network entity. The fallback information comprises a fallback type. The method further comprises sending a first message including the fallback information for the terminal device to a session management function.

In an embodiment, the third message comprises a protocol data unit (PDU) session resource modify response message.

According to a third aspect of the present disclosure, there is provided a method performed by a radio access network entity. The method comprises determining to trigger fallback for a terminal device. The method further comprises sending a third message including fallback information for the terminal device to an access and mobility management function. The fallback information comprises a fallback type.

According to a fourth aspect of the present disclosure, there is provided a session management function. The session management function comprises one or more processors and one or more memories storing computer program codes. The one or more memories and the computer program codes configured to, with the one or more processors, cause the session management function at least to receive a first message including fallback information for a terminal device from an access and mobility management function. The fallback information comprises a fallback type. The session management function is further caused to determine whether data buffering for the terminal device is required based on the fallback information. The session management function is further caused to, in response to a determination that the data buffering for the terminal device is required, send a second message comprising a buffering indication to a user plane function. The buffering indication indicates the user plane function to buffer the data for the terminal device.

According to a fifth aspect of the present disclosure, there is provided an access and mobility management function. The access and mobility management function comprises one or more processors and one or more memories storing computer program codes. The one or more memories and the computer program codes configured to, with the one or more processors, cause the access and mobility management function at least to receive a third message including fallback information for a terminal device from a radio access network entity. The fallback information comprises a fallback type. The access and mobility management function is further caused to send a first message including the fallback information for the terminal device to a session management function.

According to a sixth aspect of the present disclosure, there is provided a radio access network entity. The radio access network entity comprises one or more processors and one or more memories storing computer program codes. The one or more memories and the computer program codes configured to, with the one or more processors, cause the radio access network entity at least to determine to trigger fallback for a terminal device. The radio access network entity is further caused to send a third message including fallback information for the terminal device to an access and mobility management function. The fallback information comprises a fallback type.

According to a seventh aspect of the present disclosure, there is provided a session management function. The session management function comprises a receiving module, a determining module and a sending module. The receiving module may be configured to receive a first message including fallback information for a terminal device from an access and mobility management function. The fallback information comprises a fallback type. The determining module may be configured to determine whether data buffering for the terminal device is required based on the fallback information. The sending module may be configured to, in response to a determination that the data buffering for the terminal device is required, send a second message comprising a buffering indication to a user plane function. The buffering indication indicates the user plane function to buffer the data for the terminal device.

According to an eighth aspect of the present disclosure, there is provided an access and mobility management function. The access and mobility management function comprises a receiving module and a sending module. The receiving module may be configured to receive a third message including fallback information for a terminal device from a radio access network entity. The fallback information comprises a fallback type. The sending module may be configured to send a first message including the fallback information for the terminal device to a session management function.

According to a ninth aspect of the present disclosure, there is provided a radio access network entity. The radio access network entity comprises a determining module and a sending module. The determining module may be configured to determine to trigger fallback for a terminal device. The sending module may be configured to send a third message including fallback information for the terminal device to an access and mobility management function. The fallback information comprises a fallback type.

According to tenth aspect of the disclosure, there is provided a computer program product comprising instructions which when executed by at least one processor, cause the at least one processor to perform the method according to any one of the first, second and third aspects.

According to an eleventh aspect of the disclosure, there is provided a computer-readable storage medium storing instructions which when executed by at least one processor, cause the at least one processor to perform the method according to any one of the first, second and third aspects.

Embodiments herein afford many advantages, of which a non-exhaustive list of examples follows. In some embodiments herein, the proposed solution can solve the signaling (such as SIP signaling) or data loss issue in fallback (such as EPS fallback or RAT fallback). In some embodiments herein, the proposed solution can shorten the call setup time for fallback via redirection. In some embodiments herein, the proposed solution can avoid the signaling (such as SIP signaling) or data retransmission. In some embodiments herein, the proposed solution can improve the system (such as P-CSCF) performance. The embodiments herein are not limited to the features and advantages mentioned above. A person skilled in the art will recognize additional features and advantages upon reading the following detailed description.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
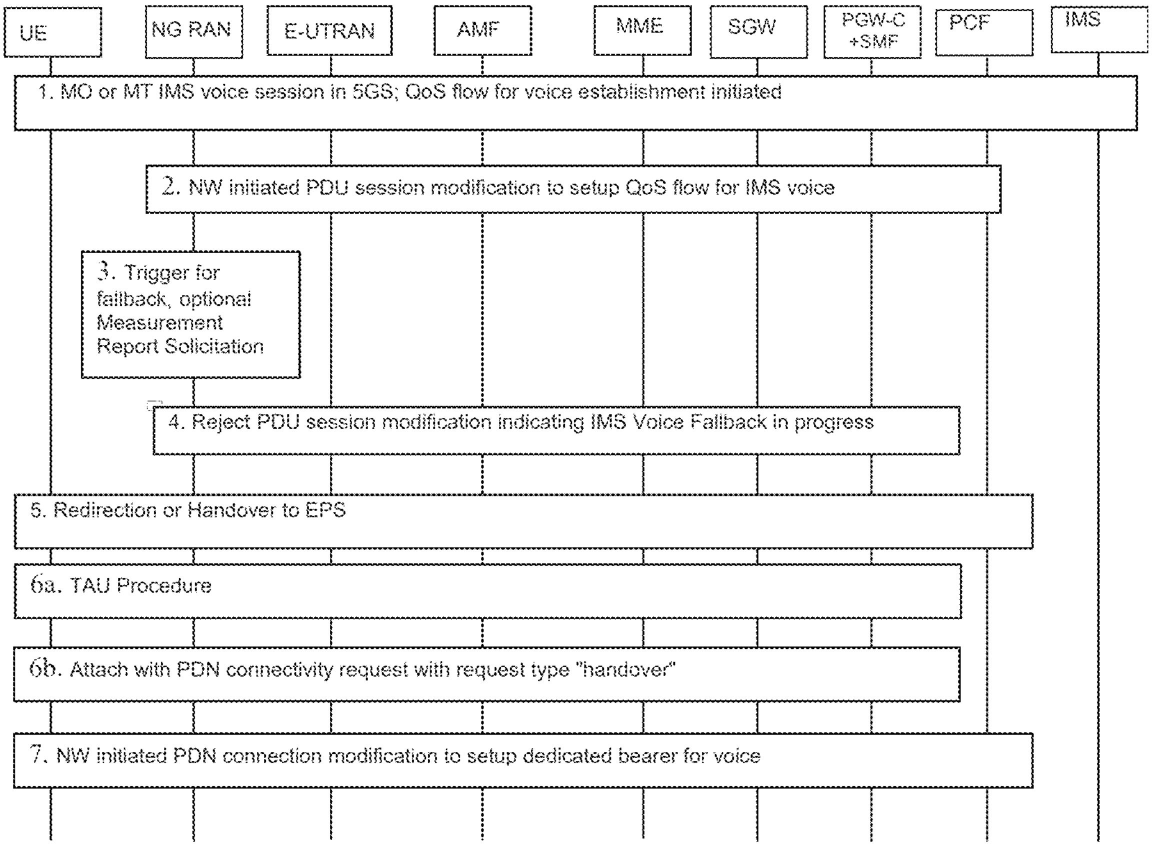
FIG. 1 (Prior Art)
FIG. 1 shows an EPS Fallback for IMS voice.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term “network” refers to a network following any suitable communication standards such as new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably. Furthermore, the communications between two devices in the network may be performed according to any suitable communication protocols, including, but not limited to, the communication protocols as defined by a standard organization such as 3GPP. For example, the communication protocols may comprise the first generation (1G), 2G, 3G, 4G, 4.5G, 5G communication protocols, and/or any other protocols either currently known or to be developed in the future.

The term "network function (NF)" refers to any suitable network function (NF) which can be implemented in a network entity (physical or virtual) of a communication network. For example, the network function can be implemented either as a network element on a dedicated hardware, as a software instance running on a dedicated hardware, or as a virtualized function instantiated on an appropriate platform, e.g. on a cloud infrastructure. For example, the 5G system (5GS) may comprise a plurality of NFs such as AMF (Access and mobility Function), SMF (Session Management Function), AUSF (Authentication Service Function), UDM (Unified Data Management), PCF (Policy Control Function), AF (Application Function), NEF (Network Exposure Function), UPF (User plane Function) and NRF (Network Repository Function), RAN (radio access network), SCP (service communication proxy), NWDAF (network data analytics function), NSSF (Network Slice Selection Function), NSSAAF (Network Slice-Specific Authentication and Authorization Function), etc. For example, the 4G system (such as LTE) may include a plurality of NFs such as MME (Mobile Management Entity), HSS (home subscriber server), Policy and Charging Rules Function (PCRF), Packet Data Network Gateway (PGW), PGW control plane (PGW-C or P-GW-C), Serving gateway (SGW), SGW control plane (SGW-C), E-UTRAN Node B (eNB), etc. In other embodiments, the network function may comprise different types of NFs for example depending on a specific network.

The term "terminal device" refers to any end device that can access a communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3GPP (3rd Generation Partnership Project), such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the communication network. Instead, a UE may represent a device that is intended for sale to, or operation by, a human user but that may not initially be associated with a specific human user.

As yet another example, in an Internet of Things (IoT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

As used herein, the phrase "at least one of A and B" or "at least one of A or B" should be understood to mean "only A, only B, or both A and B." The phrase "A and/or B" should be understood to mean "only A, only B, or both A and B".

The terminology used herein is for the purpose of describing particular embodiments only and is not intended to be limiting of example embodiments. As used herein, the singular forms “a”, “an” and “the” are intended to include the plural forms as well, unless the context clearly indicates otherwise. It will be further understood that the terms “comprises”, “comprising”, “has”, “having”, “includes” and/or “including”, when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

Figure 6:
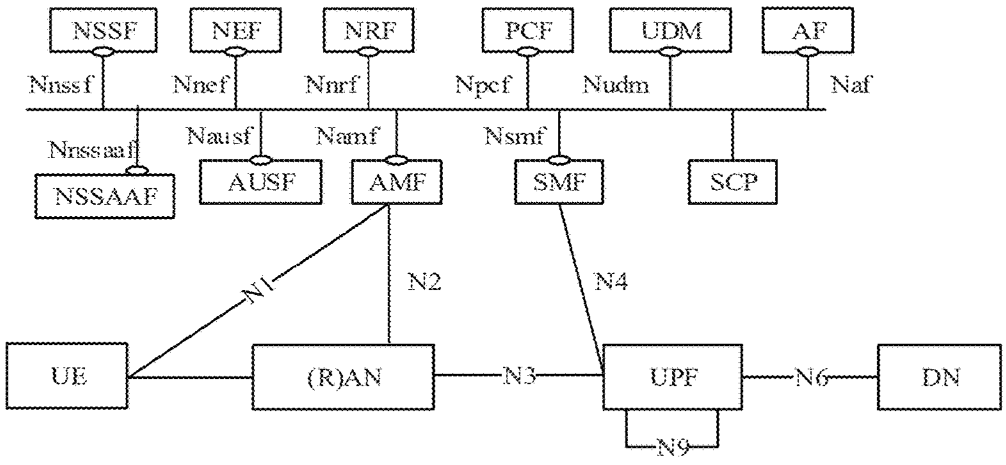
FIG. 6 (Prior Art)
FIG. 6 schematically shows a high level architecture in the fifth generation network according to an embodiment of the present disclosure.
Figure 7:
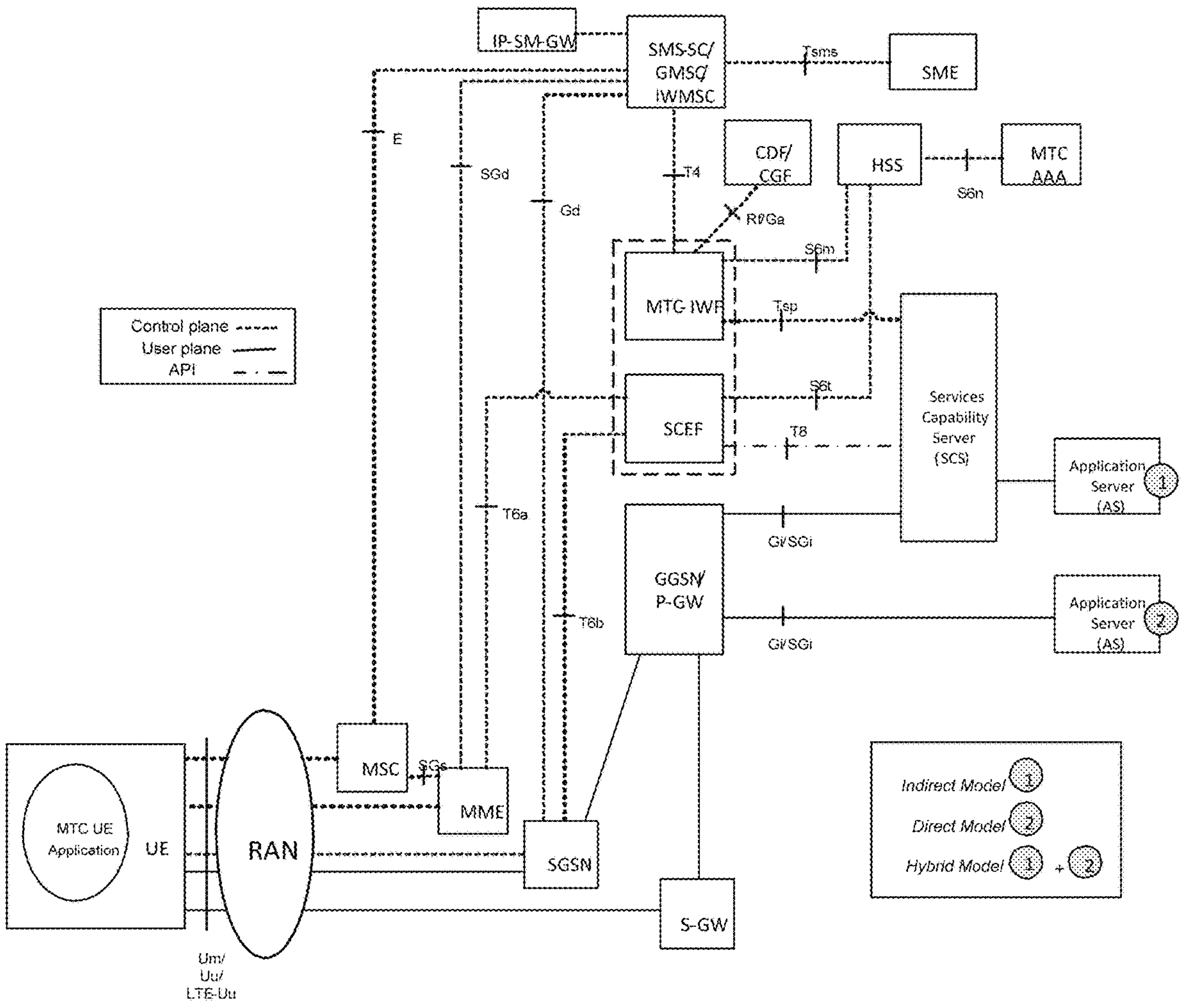
FIG. 7 (Prior Art)
FIG. 7 schematically shows a system architecture in a 4G network according to an embodiment of the present disclosure.

Although the subject matter described herein may be implemented in any appropriate type of system using any suitable components, the embodiments disclosed herein are described in relation to a communication system complied with the exemplary system architectures illustrated in FIGS. 6-7. For simplicity, the system architectures of FIGS. 6-7 only depict some exemplary elements. In practice, a communication system may further include any additional elements suitable to support communication between terminal devices or between a wireless device and another communication device, such as a landline telephone, a service provider, or any other network node or terminal device. The communication system may provide communication and various types of services to one or more terminal devices to facilitate the terminal devices' access to and/or use of the services provided by, or via, the communication system.

FIG. 6 schematically shows a high level architecture in the fifth generation network according to an embodiment of the present disclosure. For example, the fifth generation network may be 5GS. The architecture of FIG. 6 is same as FIG. 4.2.3-1 as described in 3GPP TS 23.501 V16.7.0, the disclosure of which is incorporated by reference herein in its entirety. The system architecture of FIG. 6 may comprise some exemplary elements such as AUSF, AMF, DN (data network), NEF, NRF, NSSF, PCF, SMF, UDM, UPF, AF, UE, (R)AN, SCP (Service Communication Proxy), NSSAAF (Network Slice-Specific Authentication and Authorization Function), etc.

In accordance with an exemplary embodiment, the UE can establish a signaling connection with the AMF over the reference point N1, as illustrated in FIG. 6. This signaling connection may enable NAS (Non-access stratum) signaling exchange between the UE and the core network, comprising a signaling connection between the UE and the (R)AN and the N2 connection for this UE between the (R)AN and the AMF. The (R)AN can communicate with the UPF over the reference point N3. The UE can establish a protocol data unit (PDU) session to the DN (data network, e.g. an operator network or Internet) through the UPF over the reference point N6.

As further illustrated in FIG. 6, the exemplary system architecture also contains the service-based interfaces such as Nnrf, Nnef, Nausf, Nudm, Npcf, Namf and Nsmf exhibited by NFs such as the NRF, the NEF, the AUSF, the UDM, the PCF, the AMF and the SMF. In addition, FIG. 6 also shows some reference points such as N1, N2, N3, N4, N6 and N9, which can support the interactions between NF services in the NFs. For example, these reference points may be realized through corresponding NF service-based interfaces and by specifying some NF service consumers and providers as well as their interactions in order to perform a particular system procedure.

Various NFs shown in FIG. 6 may be responsible for functions such as session management, mobility management, authentication, security, etc. The AUSF, AMF, DN, NEF, NRF, NSSF, PCF, SMF, UDM, UPF, AF, UE, (R)AN, SCP may include the functionality for example as defined in clause 6.2 of 3GPP TS23.501 V16.7.0.

Figure 4:
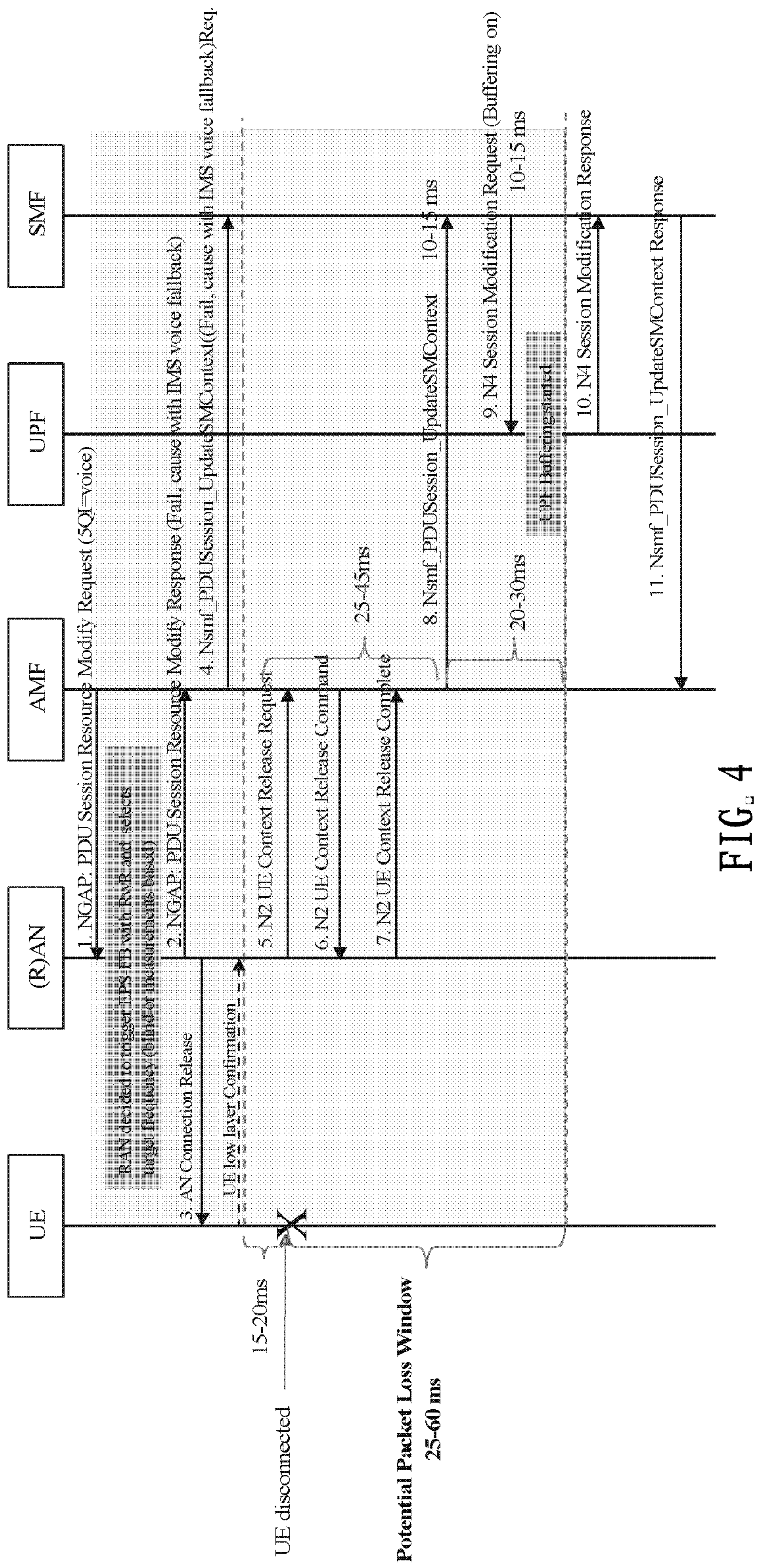
FIG. 4 shows an example of packet loss window in existing UPF buffering solution for EPS fallback via redirection.
Figure 5:
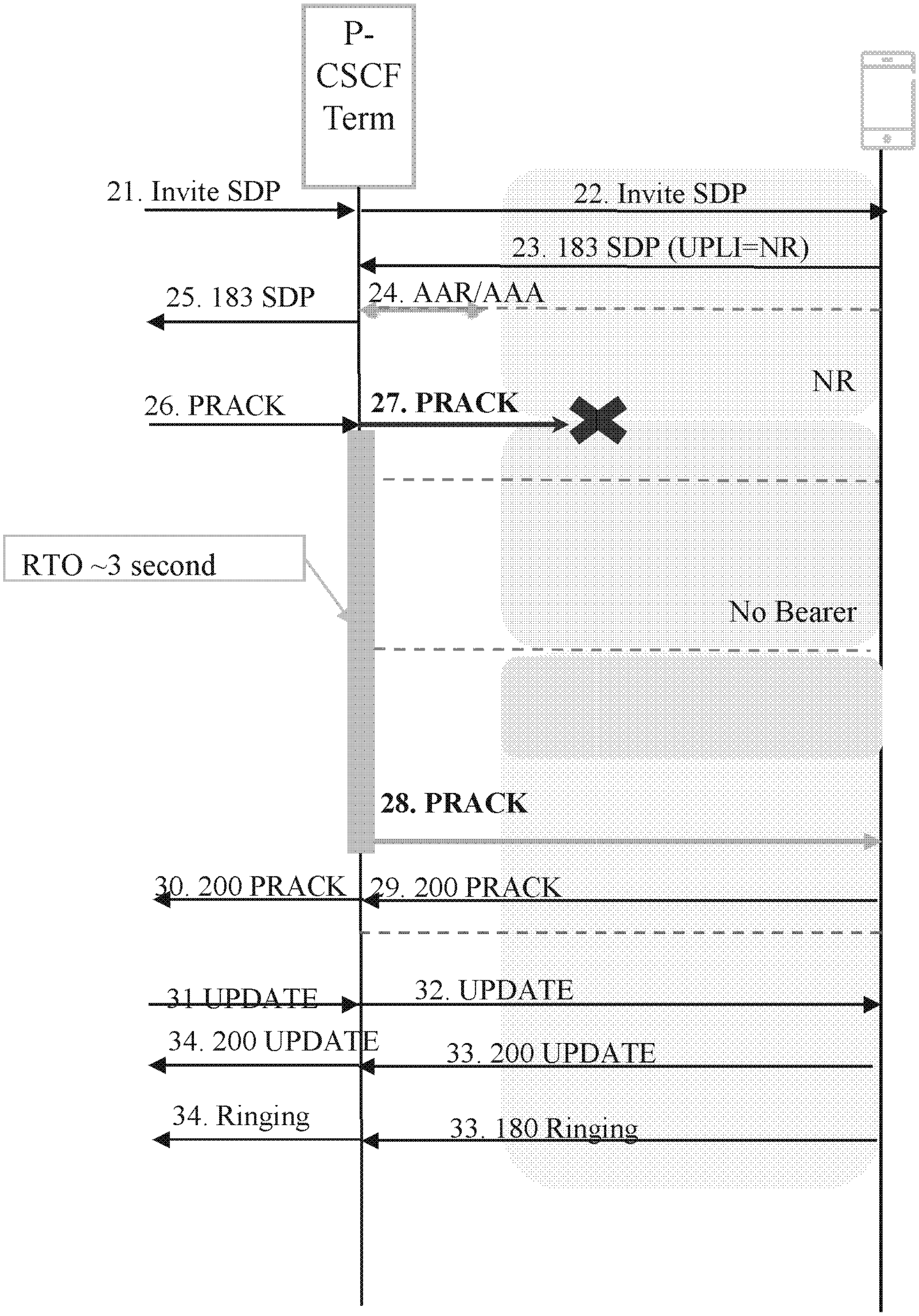
FIG. 5 shows an example of long retransmission causing call setup delay.

FIG. 7 schematically shows a system architecture in a 4G network according to an embodiment of the present disclosure, which is the same as FIG. 4.2-1a of 3GPP TS 23.682 V16.8.0, the disclosure of which is incorporated by reference herein in its entirety. The system architecture of FIG. 7 may comprise some exemplary elements such as Services Capability Server (SCS), Application Server (AS), SCEF (Service Capability Exposure Function), HSS, UE, RAN (Radio Access Network), SGSN (Serving GPRS (General Packet Radio Service) Support Node), MME, MSC (Mobile Switching Centre), S-GW (Serving Gateway), GGSN/P-GW (Gateway GPRS Support Node/PDN (Packet Data Network) Gateway), MTC-IWF (Machine Type Communications-InterWorking Function) CDF/CGF (Charging Data Function/Charging Gateway Function), MTC-AAA (Machine Type Communications-authentication, authorization and accounting), SMS-SC/GMSC/IWMSC(Short Message Service-Service Centre/Gateway MSC/InterWorking MSC) IP-SM-GW (Internet protocol Short Message Gateway). The network elements and interfaces as shown in FIG. 7 may be same as the corresponding network elements and interfaces as described in 3GPP TS 23.682 V16.8.0.

Figure 8:
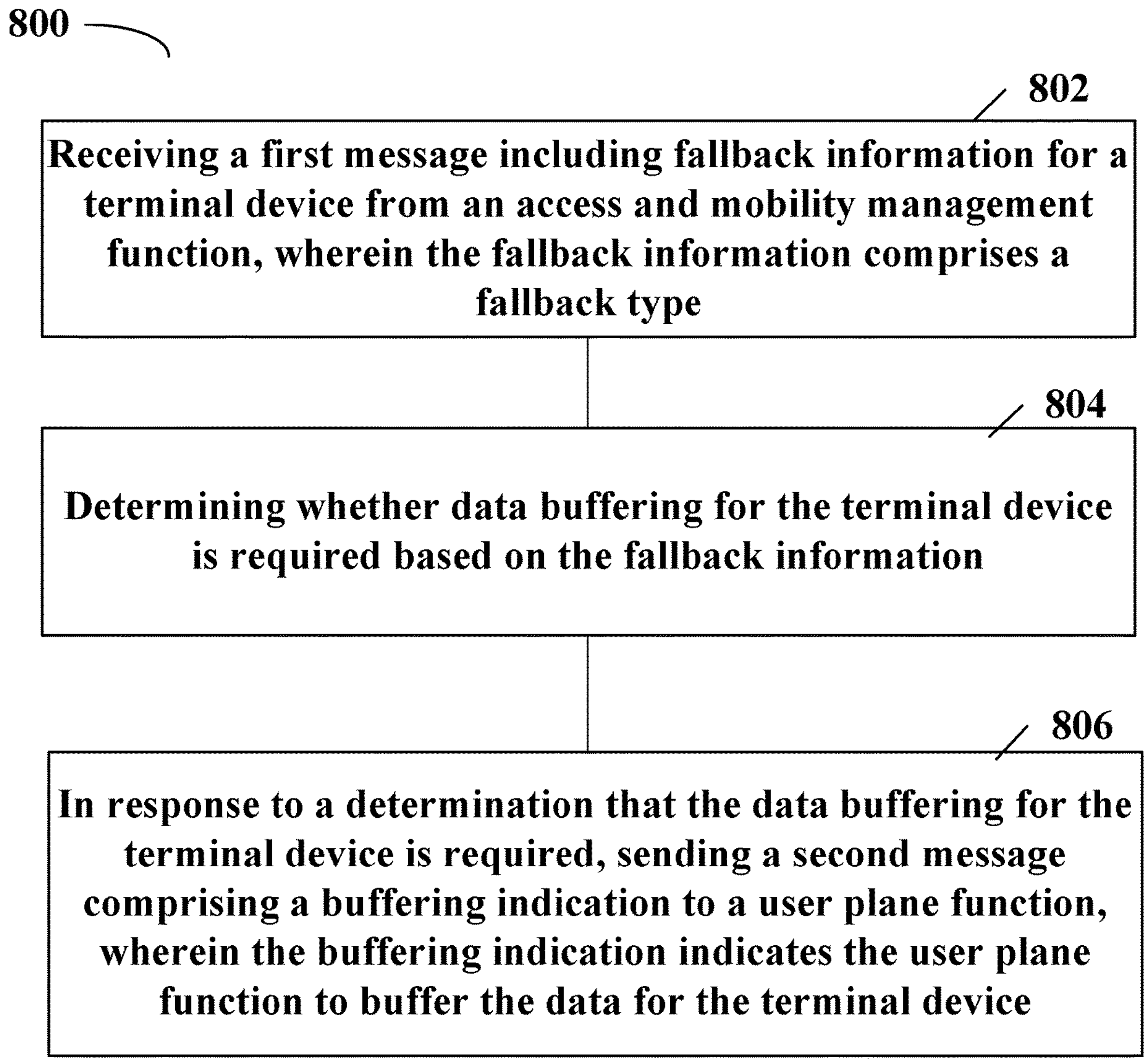
FIG. 8 shows a flowchart of a method according to an embodiment of the present disclosure.

FIG. 8 shows a flowchart of a method according to an embodiment of the present disclosure, which may be performed by an apparatus implemented in/as or communicatively coupled to a session management function. As such, the apparatus may provide means or modules for accomplishing various parts of the method 800 as well as means or modules for accomplishing other processes in conjunction with other components. The session management function may be any suitable entity or node which can implement the session management function. For example, the session management function may be PGW combined with SMF (PGW+SMF) or PGW-C combined with SMF (PGW-C+SMF).

At block 802, the session management function receives a first message including fallback information for a terminal device from an access and mobility management function. The fallback information comprises a fallback type. The access and mobility management function may be any suitable network entity which can support access and mobility management function. For example, the access and mobility management function may be AMF.

The fallback may be triggered due to various reasons, such as taking into account UE capabilities, indication from AMF that “Redirection for EPS fallback for voice is possible”, network configuration (e.g. N26 availability configuration), radio conditions, load balance, service requirements, etc.

The fallback may be related to various services. In an embodiment, the fallback is related to Internet protocol multimedia subsystem (IMS) service such as IMS voice service.

The first message may be any suitable message which can be transferred between the session management function and the access and mobility management function. For example, the message may be Nsmf_PDUSession_UpdateSMContext request with N2 PDU Session Resource Modify Response Transfer or PDU Session Resource Modify Response Transfer as described in 3GPP TS 23.502 V16.7.0.

The fallback may be any suitable fallback. In an embodiment, the fallback may comprise at least one of evolved packet system (EPS) fallback or radio access technology (RAT) fallback.

The fallback information may include information related to the fallback. In an embodiment, the fallback information may include a fallback type. The fallback type may indicate a specific fallback procedure triggered by a RAN.

In an embodiment, the fallback type may comprise at least one of redirection or handover.

In an embodiment, the redirection may comprise at least one of redirection to a first network from a second network; or redirection to the first network connected to a core network of the second network.

In an embodiment, the handover may comprise at least one of handover to a first network from a second network; or handover to the first network connected to a core network of the second network.

The first network may be any suitable network. The second network may be any suitable network. In an embodiment, the first network may comprise an evolved packet system (EPS). In an embodiment, the second network may comprise a fifth generation system (5GS).

In an embodiment, the fallback type may indicate at least one procedure triggered by a RAN:

Redirection to EPS;

Handover procedure to EPS;

Redirection to E-UTRA connected to 5GC; or

Handover to E-UTRA connected to 5GC.

At block 804, the session management function may determine whether data buffering for the terminal device is required based on the fallback information. For example, the session management function may determine whether data buffering for the terminal device is required based on the fallback type. The data may be any suitable data such as signaling data or user data. In an embodiment, the data may be SIP signaling.

In an embodiment, when the fallback type is redirection, the session management function may determine that the data buffering for the terminal device is required. For example, when the fallback type is Redirection to EPS, the session management function may determine that the data buffering for the terminal device is required. When the fallback type is Redirection to E-UTRA connected to 5GC, the session management function may determine that the data buffering for the terminal device is required.

In an embodiment, when the fallback type is handover, the session management function may determine that the data buffering for the terminal device is not required. For example, when the fallback type is Handover procedure to EPS, the session management function may determine that the data buffering for the terminal device is not required. When the fallback type is Handover to E-UTRA connected to 5GC, the session management function may determine that the data buffering for the terminal device is not required.

For example, in 5GS, if the NG-RAN performs redirection to EPS, or redirection to E-UTRA connected to 5GC, it means that the UE will be forced to idle state and the fallback type may comprise redirection (such as redirection to EPS, or redirection to E-UTRA connected to 5GC), and then the session management function may determine that the data buffering for the terminal device is required. In case of NG-RAN performs handover procedure (such as Handover procedure to EPS or Handover to E-UTRA connected to 5GC), and then the session management function may determine that the data buffering for the terminal device is not required.

At block 806, in response to a determination that the data buffering for the terminal device is required, the session management function sends a second message comprising a buffering indication to a user plane function (such as UPF). The buffering indication indicates the user plane function to buffer the data for the terminal device.

The second message may be any suitable message which can be transferred between the session management function and the access and the user plane function. In an embodiment, the second message may comprise an N4 Session Modification Request message as described in 3GPP TS 23.502 V16.7.0.

Figure 2:
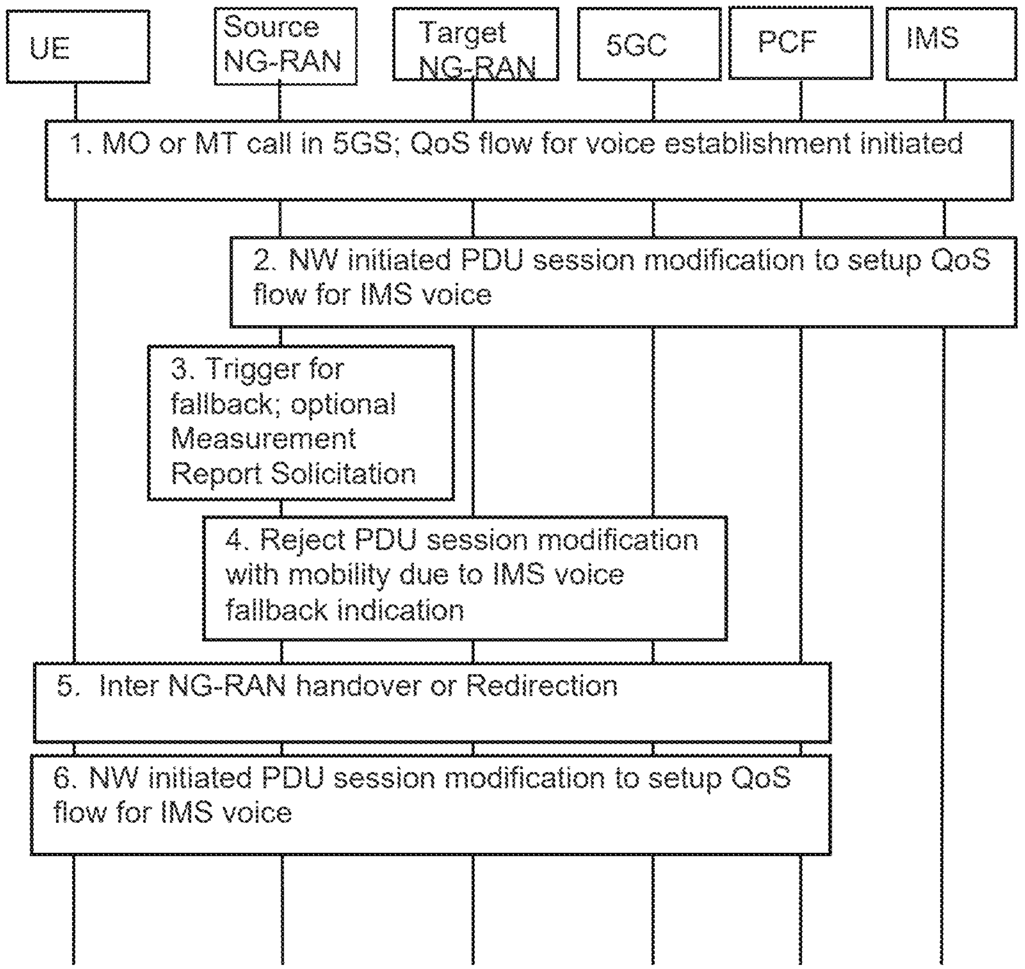
FIG. 2 (Prior Art)
FIG. 2 shows a RAT Fallback for IMS voice.
Figure 3:
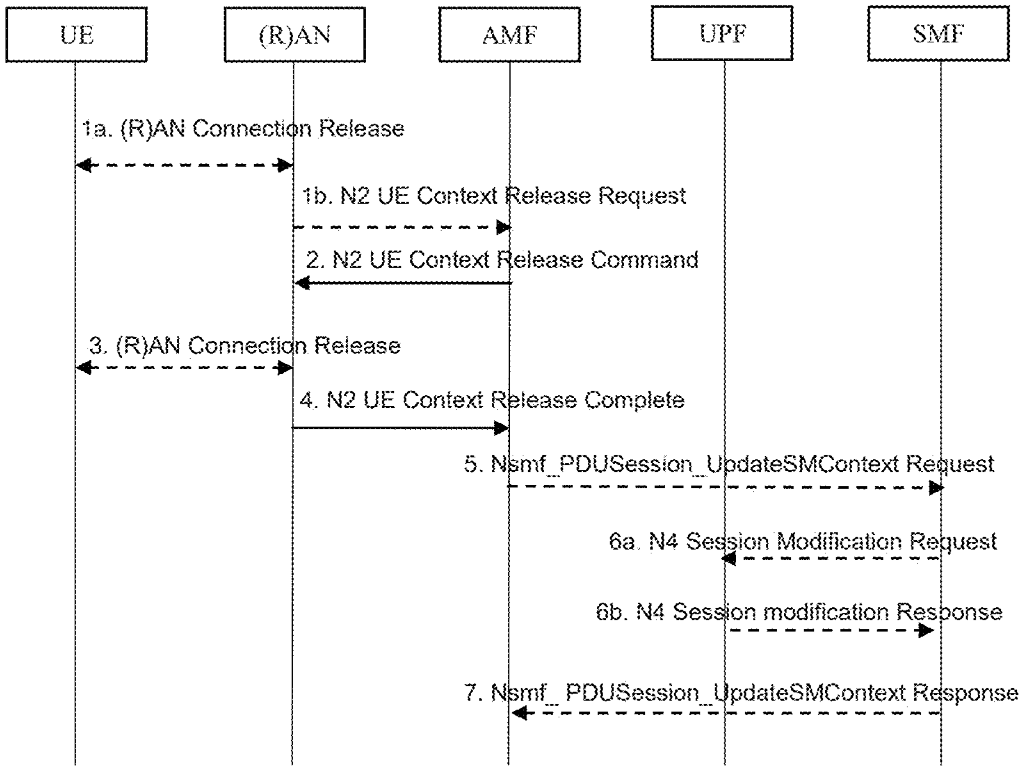
FIG. 3 (Prior Art)
FIG. 3 shows an AN (access network) release procedure.

The second message may be sent at any suitable time point. In an embodiment, the second message may be sent during or before an access network release procedure. For example, the second message may be sent at step 6*a* of FIG. 3. The second message may be sent at step 4 of FIG. 2. The second message may be sent at step 4 of FIG. 1.

In an embodiment, the second message is sent immediately after determining that the data buffering for the terminal device is required based on the fallback information.

In an embodiment, when the buffering indication is sent before the access network release procedure, the buffering indication has a higher priority than a buffering indication sent during the access network release procedure. For example, At step 6*a* of FIG. 3, SMF may send an N4 Session Modification Request (AN or N3 UPF Tunnel Info to be removed, Buffering on/off) to UPF, the buffering indication sent before the access network release procedure has a higher priority than the Buffering on/off sent at step 6*a* of FIG. 3.

Figure 9:
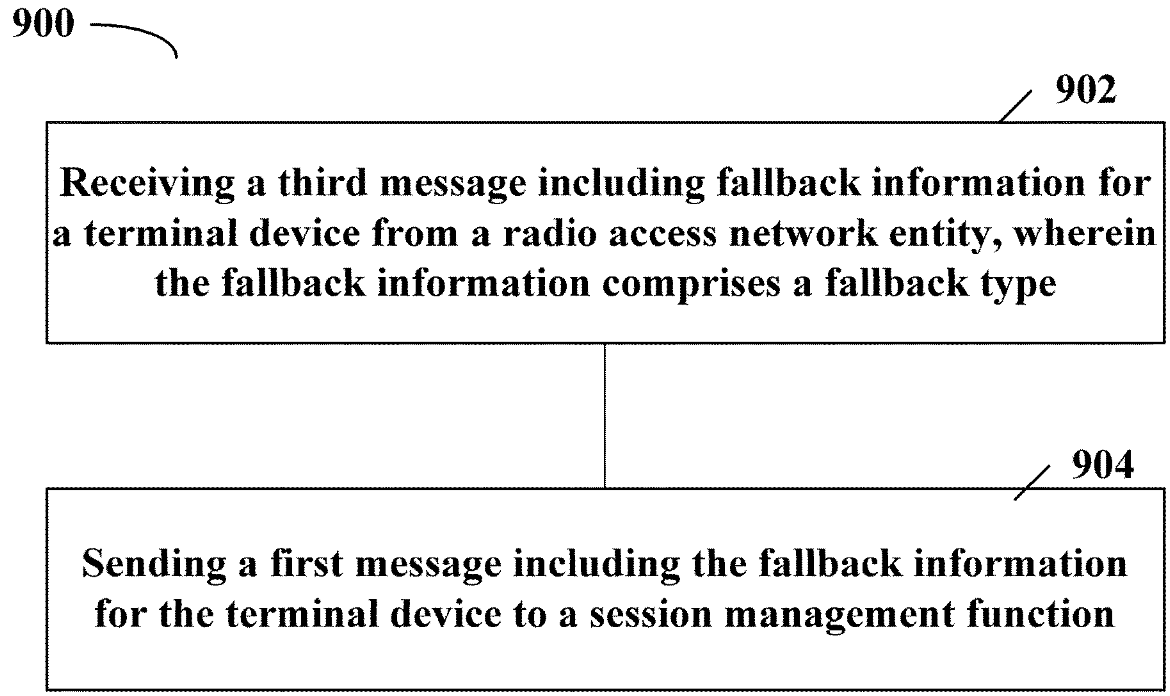
FIG. 9 shows a flowchart of a method according to another embodiment of the present disclosure.

FIG. 9 shows a flowchart of a method according to another embodiment of the present disclosure, which may be performed by an apparatus implemented in/as or communicatively coupled to an access and mobility management function. As such, the apparatus may provide means or modules for accomplishing various parts of the method 900 as well as means or modules for accomplishing other processes in conjunction with other components. The access and mobility management function may be any suitable entity or node which can implement access and mobility management function. For example, the access and mobility management function may be AMF. For some parts which have been described in the above embodiments, the description thereof is omitted here for brevity.

At block 902, the access and mobility management function receives a third message including fallback information for a terminal device from a radio access network entity. The fallback information comprises a fallback type. The radio access network may be any suitable network entity which can support radio access function. For example, the radio access network may be NG-RAN. The fallback type has been described above. The third message may be any suitable message which can be transferred between the radio access network and the access and mobility management function. For example, the third message may comprise a protocol data unit (PDU) session resource modify response message as described in 3GPP TS 23.502 V16.7.0.

At block 904, the access and mobility management function sends a first message including the fallback information for the terminal device to a session management function. The first message has been described in the above embodiments. In an embodiment, the session management function may be PGW-C+SMF.

Figure 10:
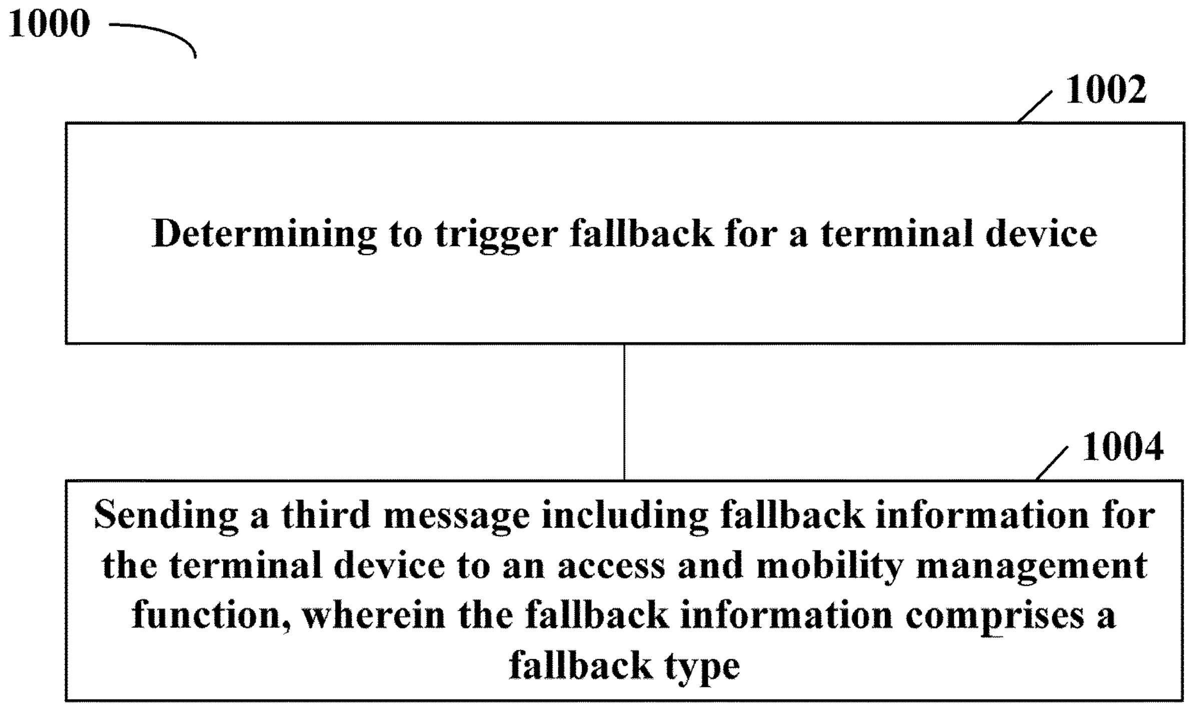
FIG. 10 shows a flowchart of a method according to another embodiment of the present disclosure.

FIG. 10 shows a flowchart of a method according to another embodiment of the present disclosure, which may be performed by an apparatus implemented in/as or communicatively coupled to a radio access network. As such, the apparatus may provide means or modules for accomplishing various parts of the method 1000 as well as means or modules for accomplishing other processes in conjunction with other components. The radio access network may be any suitable entity or node which can implement the radio access function. For example, the radio access network may be NG-RAN. For some parts which have been described in the above embodiments, the description thereof is omitted here for brevity.

At block 1002, the radio access network determines to trigger fallback for a terminal device. The radio access network may determine to trigger fallback for the terminal device due to various reasons. For example, NG-RAN may be configured to support EPS fallback for IMS voice and decide to trigger fallback to EPS, taking into account UE capabilities, indication from AMF that "Redirection for EPS fallback for voice is possible", network configuration (e.g. N26 availability configuration) and radio conditions.

At block 1004, the radio access network sends a third message including fallback information for the terminal device to an access and mobility management function. The fallback information comprises a fallback type. The third message has been described above.

Figure 11:
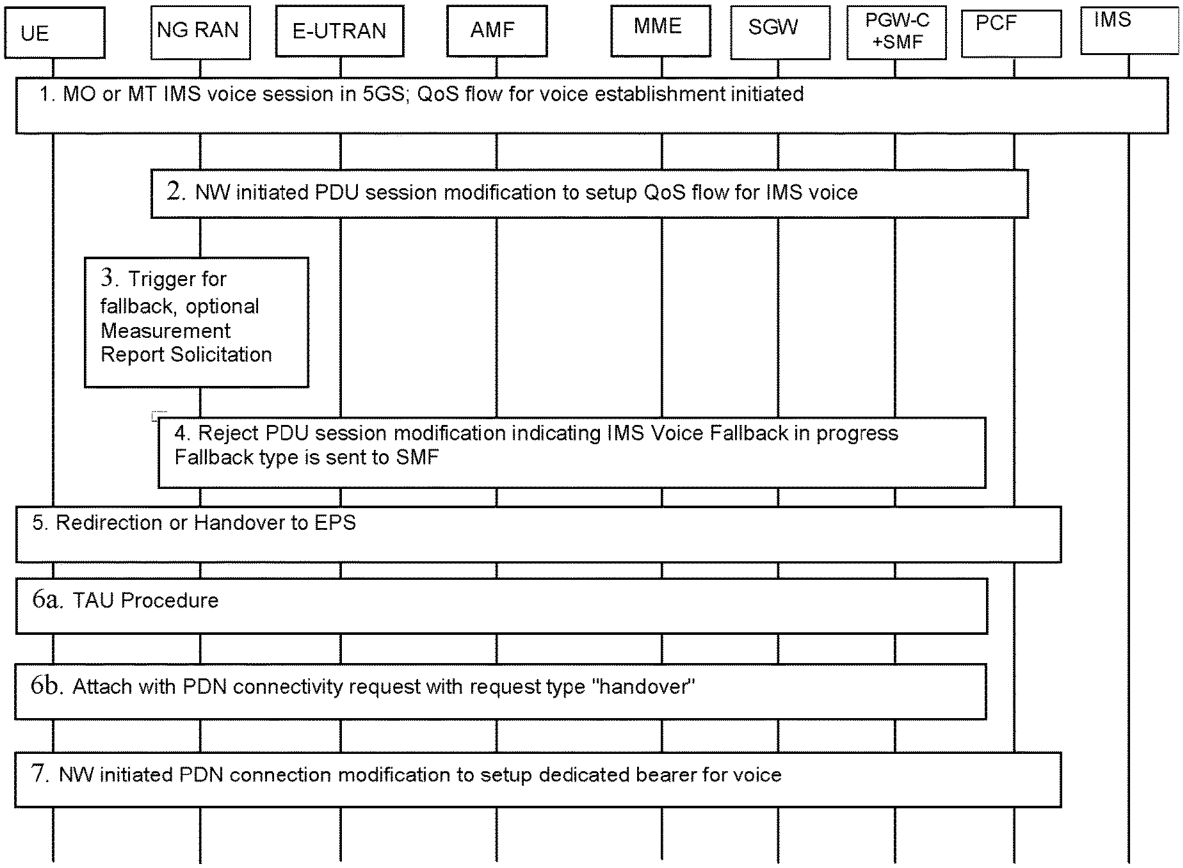
FIG. 11 is a flowchart illustrating EPS Fallback for IMS voice according to an embodiment of the present disclosure.

FIG. 11 is a flowchart illustrating EPS Fallback for IMS voice according to an embodiment of the present disclosure.

When the UE is served by the 5G System, the UE has one or more ongoing PDU Sessions each including one or more QoS Flows. The serving PLMN (Public Land Mobile Network) AMF has sent an indication towards the UE during the Registration procedure that IMS voice over PS session is supported, see clause 5.16.3.10 in 3GPP TS 23.501 V16.7.0 and the UE has registered in the IMS. If N26 is not supported, the serving PLMN AMF sends an indication towards the UE during the Registration procedure that interworking without N26 is supported, see clause 5.17.2.3.1 in 3GPP TS 23.501 V16.7.0.

At step 1. UE camps on NG-RAN in the 5GS and an MO (Mobile Originated) or MT (Mobile Terminated) IMS voice session establishment has been initiated.

At step 2. Network initiated PDU Session modification to setup QoS flow for voice reaches the NG-RAN (see N2 PDU Session Request in clause 4.3.3 of 3GPP TS 23.502 V16.7.0).

At step 3. NG-RAN is configured to support EPS fallback for IMS voice and decides to trigger fallback to EPS, taking into account UE capabilities, indication from AMF that "Redirection for EPS fallback for voice is possible" (received as part of initial context setup, handover resource allocation or path switch request acknowledge as defined in 3GPP TS 38.413 V16.4.0), network configuration (e.g. N26 availability configuration) and radio conditions. If NG-RAN decides not to trigger fallback to EPS, then the procedure stops here and following steps are not executed.

NG-RAN may initiate measurement report solicitation from the UE including E-UTRAN as target.

NOTE 1: If AMF has indicated that "Redirection for EPS fallback for voice is not possible", then EPS fallback for IMS voice is not performed in step 5. If NG-RAN has not received indication "Redirection for EPS fallback for voice", the decision to execute EPS fallback for IMS voice or not is based on network configuration (e.g. based on N26 availability and other criteria).

At step 4. NG-RAN responds indicating rejection of the PDU Session modification to setup QoS flow for IMS voice received in step 2 by PDU Session Modification Response message towards the SMF+PGW-C (or H-SMF+P-GW-C via V-SMF, in the case of home routed roaming scenario) via AMF with an indication that mobility (i.e. handover or AN release with redirect) due to fallback for IMS voice is ongoing. The SMF+PGW-C maintains the PCC rule(s) associated with the QoS Flow(s) and reports the EPS Fallback event to the PCF if PCF has subscribed to this event. If the NG-RAN indicates fallback for IMS voice is ongoing with AN release for example with redirection (such as inter-system redirection), the SMF requests UPF to buffer the downlink packets.

At step 5. NG-RAN initiates either handover (see clause 4.11.1.2.1 of 3GPP TS 23.502 V16.7.0), or AN Release via inter-system redirection to EPS (see clause 4.2.6 and clause 4.11.1.3.2 of 3GPP TS 23.502 V16.7.0), taking into account UE capabilities. The SMF+PGW-C reports change of the RAT type if subscribed by PCF as specified in clause 4.11.1.2.1, or clause 4.11.1.3.2.6 of 3GPP TS 23.502 V16.7.0. When the UE is connected to EPS, either **6*a* or 6*b* is executed At step 6*a*. In the case of 5GS to EPS handover, see clause 4.11.1.2.1 of 3GPP TS 23.502 V16.7.0, and in the case of inter-system redirection to EPS with N26 interface, see clause 4.11.1.3.2 of 3GPP TS 23.502 V16.7.0. In either case the UE initiates TAU (Tracking Area Update) procedure and the UE includes active flag in the request in the case of inter-system redirection to EPS; or At step 6*b***. In the case of inter-system redirection to EPS without N26 interface, see clause 4.11.2.2 of 3GPP TS 23.502 V16.7.0. If the UE supports Request Type flag "handover" for PDN connectivity request during the attach procedure as described in clause 5.3.2.1 of 3GPP TS 23.401 V16.9.0 and has received the indication that interworking without N26 is supported, then the UE initiates Attach with PDN connectivity request with request type "handover".

In the case of inter-system redirection for the emergency service, the UE uses the emergency indication in the RRC message as specified in clause 6.2.2 of 3GPP TS 36.331 V16.3.0 and E-UTRAN provides the emergency indication to MMDE during Tracking Area Update or Attach procedure. For the handover procedure see clause 4.11.1.2.1 of 3GPP TS 23.502 V16.7.0, step 1.

At step 7. After completion of the mobility procedure to EPS or as part of the 5GS to EPS handover procedure, the SMF+PGW-C re-initiates the setup of the dedicated bearer (s) for the maintained PCC rule(s) in step 4 including of the dedicated bearer for IMS voice, mapping the 5G QoS to EPC QoS parameters as specified in clause 4.11.1.2.1 of 3GPP TS 23.502 V16.7.0. If the SMF+PGW-C has requested the UPF to buffer downlink packet in step 4, the SMF+PGW-C will instruct the UPF+PGW-U to send the buffered downlink packets. The SMF+PGW-C reports about Successful Resource Allocation and Access Network Information if subscribed by PCF.

The IMS signaling related to IMS voice call establishment continues after step 1 as specified in the 3GPP TS 23.228 V16.6.0.

At least for the duration of the voice call in EPS the E-UTRAN is configured to not trigger any handover to 5GS.

The steps of FIG. 11 are same as the corresponding steps as described in clause 4.13.6.1 of 3GPP TS 23.502 V16.7.0 except the underlined contents.

Figure 12:
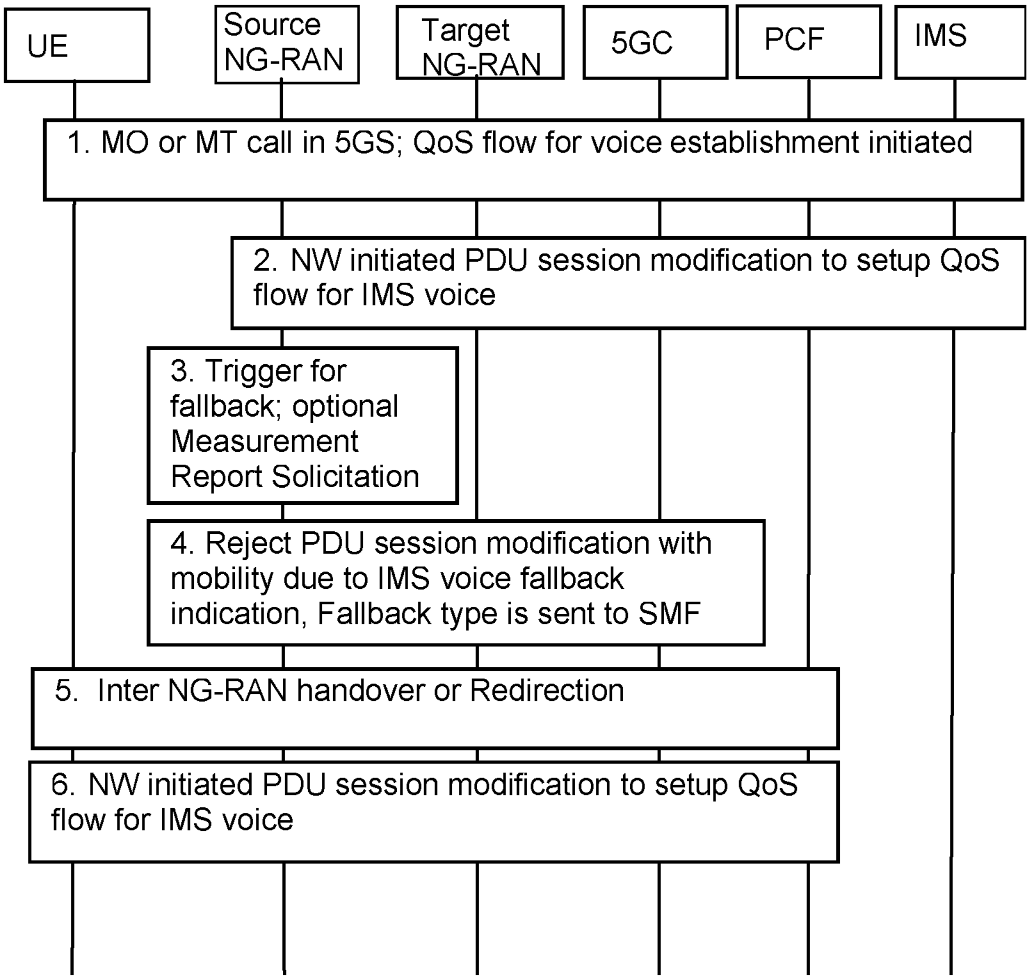
FIG. 12 is a flowchart illustrating a RAT fallback procedure in 5GC for IMS voice according to an embodiment of the present disclosure.

FIG. 12 is a flowchart illustrating a RAT fallback procedure in 5GC for IMS voice according to an embodiment of the present disclosure.

When the UE is served by the 5GC, the UE has one or more ongoing PDU Sessions each including one or more QoS Flows. The serving PLMN AMF has sent an indication towards the UE during the Registration procedure that IMS voice over PS session is supported, see clause 5.16.3.10 in 3GPP TS 23.501 V16.7.0 and the UE has registered in the IMS.

At step 1. UE camps on source NG-RAN in the 5GS and an MO or MT IMS voice session establishment has been initiated.

At step 2. Network initiated PDU Session modification to setup QoS flow for IMS voice reaches the source NG-RAN (see N2 PDU Session Request in clause 4.3.3 of 3GPP TS 23.502 V16.7.0).

At step 3. If source NG-RAN is configured to support RAT fallback for IMS voice, source NG-RAN decides to trigger RAT fallback, taking into account on UE capabilities, network configuration and radio conditions.

Source NG-RAN may initiate measurement report solicitation from the UE including target NG-RAN.

At step 4. Source NG-RAN responds indicating rejection of the PDU Session modification to setup QoS flow for IMS voice received in step 2 by PDU Session Response message towards the SMF (or V-SMF, in the case of roaming scenario) via AMF with an indication that mobility (i.e. handover or AN release with redirect) due to fallback for IMS voice is ongoing. The SMF maintains the PCC rule(s) associated with the QoS Flow(s). If the NG-RAN indicates fallback for IMS voice is ongoing with AN release for example with redirection (such as inter-system redirection), the SMF requests UPF to buffer the downlink packets.

At step 5. Source NG-RAN initiates Xn based Inter NG-RAN handover (see clause 4.9.1.2 of 3GPP TS 23.502 V16.7.0) or N2 based inter NG-RAN handover (see clause 4.9.1.3 of 3GPP TS 23.502 V16.7.0), or redirection to E-UTRA connected to 5GC (see clause 4.2.6 of 3GPP TS 23.502 V16.7.0). The SMF reports change of the RAT type if subscribed by PCF.

At step 6. After completion of the Inter NG-RAN (inter-RAT) handover or redirection to E-UTRA connected to 5GC, the SMF re-initiates the PDU Session modification to setup QoS flow for IMS voice. If the SMF+PGW-C has requested the UPF to buffer downlink packet in step 4, the SMF+PGW-C will instruct the UPF+PGW-U to send the buffered downlink packets. The SMF reports about Successful Resource Allocation and Access Network Information if subscribed by PCF.

The IMS signaling related to IMS voice call establishment continues after step 1 as specified in 3GPP TS 23.228 V16.6.0.

At least for the duration of the IMS voice call the target NG-RAN is configured to not trigger inter NG-RAN handover back to source NG-RAN.

The steps of FIG. 12 are same as the corresponding steps as described in clause 4.13.6.2 of 3GPP TS 23.502 V16.7.0 except the underlined contents.

In an embodiment, when NG-RAN rejects QoS Flow setup for voice call, the NG-RAN shall additionally include the fallback type. The fallback type indicates redirection or handover. Upon reception of QoS Flow setup rejection, if the fallback type is redirection, PGW-C+SMF requests UPF to buffer DL payload immediately.

Figure 13:
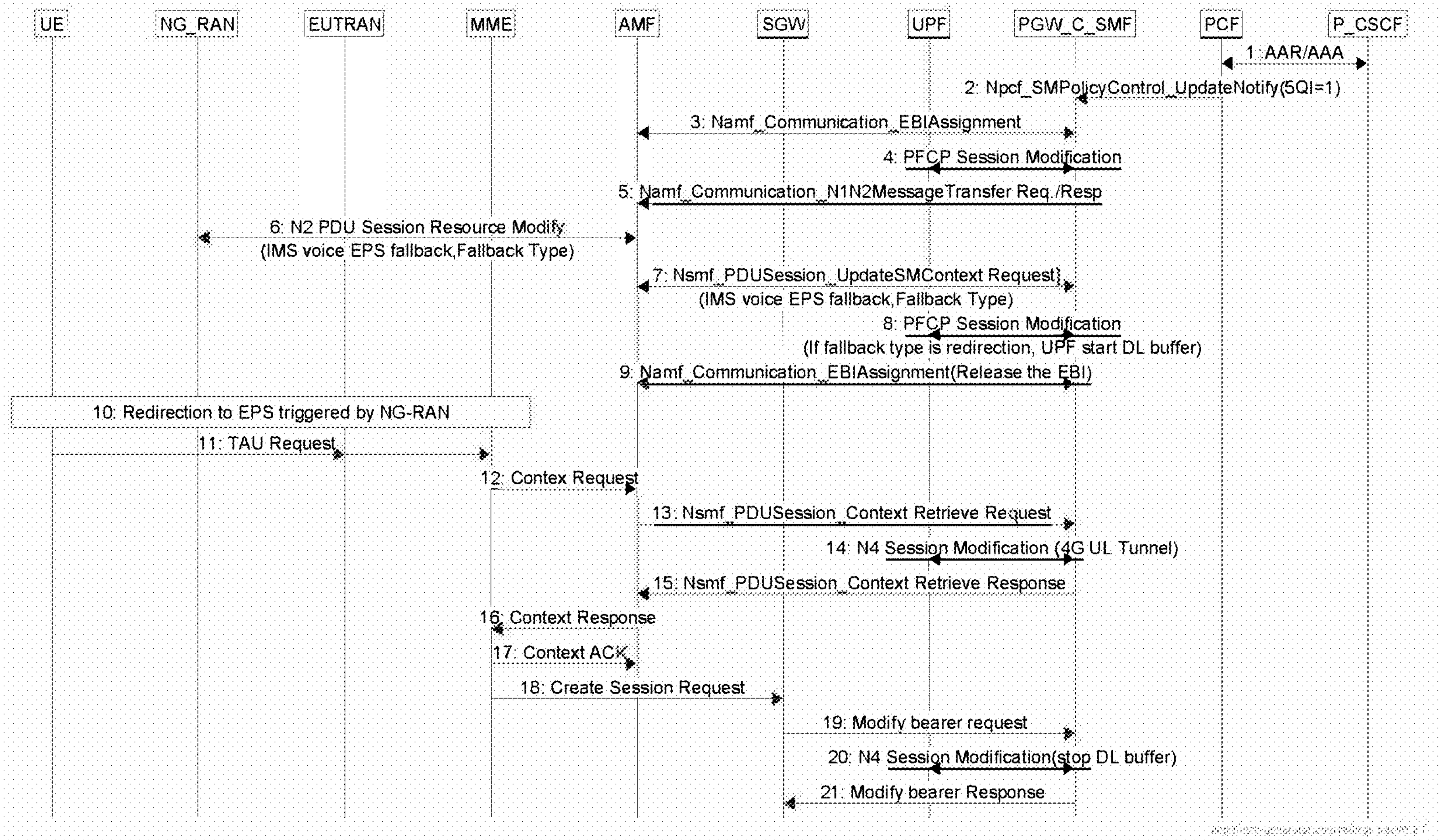
FIG. 13 is a flowchart illustrating a method of UPF buffering according to an embodiment of the present disclosure.

FIG. 13 is a flowchart illustrating a method of UPF buffering according to an embodiment of the present disclosure. Some messages of FIG. 13 are same as the corresponding messages as described in 3GPP TS 23.502 V16.7.0 and SIP, the description thereof is omitted here for brevity. AAR/AAA denotes authentication and authorization request/authentication and authorization answer.

At step 6. NG-RAN rejects the setup QoS flow for IMS voice due to EPS fallback. NG-RAN indicates the EPS fallback type: handover or AN release with redirection. NG-RAN sends them to PGW_C_SMF via AMF.

At step 7. SMF receives the EPS Fallback and EPS fallback type.

At step 8. If the NG-RAN indicates fallback for IMS voice is ongoing with AN release for example with redirection (such as inter-system redirection), the SMF requests UPF to buffer the downlink packets.

At step 20. After PDN connection setup in EPS, PGW-C_SMF requests UPF to stop buffering.

In an embodiment, clause 4.13.6.1 of 3GPP TS 23.502 V16.7.0 NG-RAN may be amended as following: the NG-RAN sends a fallback type to SMF, and SMF triggers UPF buffering after receiving the fallback type such as "AN release with redirection".

In an embodiment, clause 4.13.6.2 of 3GPP TS 23.502 V16.7.0 NG-RAN may be amended as following: the NG-RAN sends a fallback type to SMF, and SMF triggers UPF buffering after receiving the fallback type such as "AN release with redirection".

In an embodiment, 3GPP TS 38.413 V16.4.0 may provide the fallback type in PDU Session Resource Modify Response Transfer IE or in the PDU Session Resource Modify Unsuccessful Transfer IE (Cause Value).

TS 38.413: Provided EPS fallback type in PDU Session Resource Modify Response Transfer IE or in the PDU Session Resource Modify Unsuccessful Transfer IE (Cause Value).

Embodiments herein afford many advantages, of which a non-exhaustive list of examples follows. In some embodiments herein, the proposed solution can solve the signaling (such as SIP signaling) or data loss issue in fallback (such as EPS fallback or RAT fallback). In some embodiments herein, the proposed solution can shorten the call setup time for fallback via redirection. In some embodiments herein, the proposed solution can avoid the signaling (such as SIP signaling) or data retransmission. In some embodiments herein, the proposed solution can improve the system (such as P-CSCF) performance. The embodiments herein are not limited to the features and advantages mentioned above. A person skilled in the art will recognize additional features and advantages upon reading the following detailed description.

The various blocks shown in FIGS. 8-13 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 14:
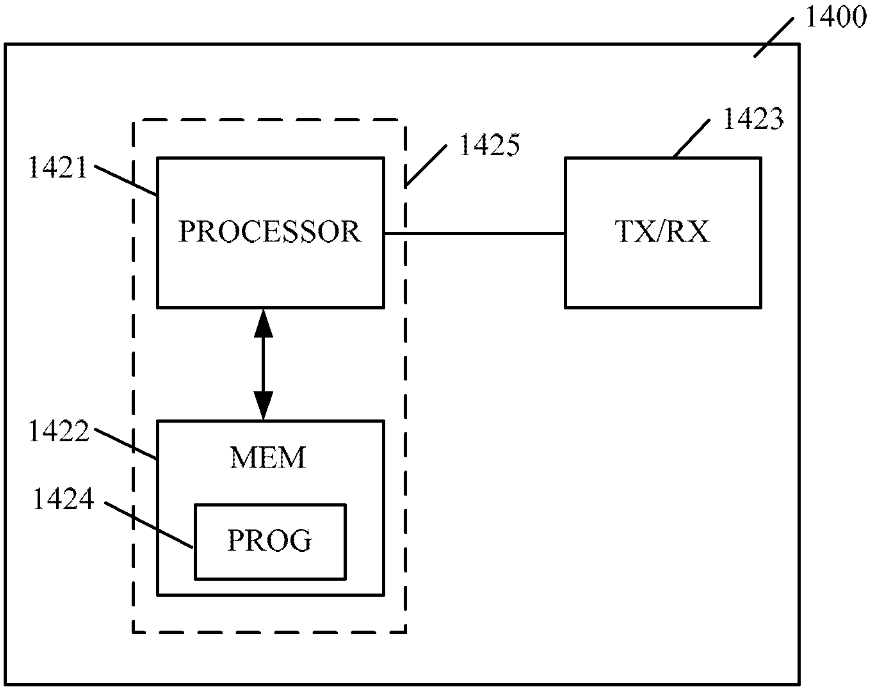
FIG. 14 is a block diagram showing an apparatus suitable for practicing some embodiments of the disclosure.

FIG. 14 is a block diagram showing an apparatus suitable for practicing some embodiments of the disclosure. For example, any one of the session management function, the access and mobility management function and the radio access network entity described above may be implemented as or through the apparatus 1400.

The apparatus 1400 comprises at least one processor 1421, such as a digital processor (DP), and at least one memory (MEM) 1422 coupled to the processor 1421. The apparatus 1420 may further comprise a transmitter TX and receiver RX 1423 coupled to the processor 1421. The MEM 1422 stores a program (PROG) 1424. The PROG 1424 may include instructions that, when executed on the associated processor 1421, enable the apparatus 1420 to operate in accordance with the embodiments of the present disclosure. A combination of the at least one processor 1421 and the at least one MEM 1422 may form processing means 1425 adapted to implement various embodiments of the present disclosure.

Various embodiments of the present disclosure may be implemented by computer program executable by one or more of the processor 1421, software, firmware, hardware or in a combination thereof.

The MEM 1422 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processor 1421 may be of any type suitable to the local technical environment, and may include one or more of general purpose computers, special purpose computers, microprocessors, digital signal processors (DSPs) and processors based on multicore processor architecture, as non-limiting examples.

In an embodiment where the apparatus is implemented as or at the session management function, the memory 1422 contains instructions executable by the processor 1421, whereby the session management function according to any of the methods related to the session management function as described above.

In an embodiment where the apparatus is implemented as or at the access and mobility management function, the memory 1422 contains instructions executable by the processor 1421, whereby the access and mobility management function operates according to any of the methods related to the access and mobility management function as described above.

In an embodiment where the apparatus is implemented as or at the radio access network entity, the memory 1422 contains instructions executable by the processor 1421, whereby the radio access network entity operates according to any of the methods related to the radio access network entity as described above.

Figure 15:
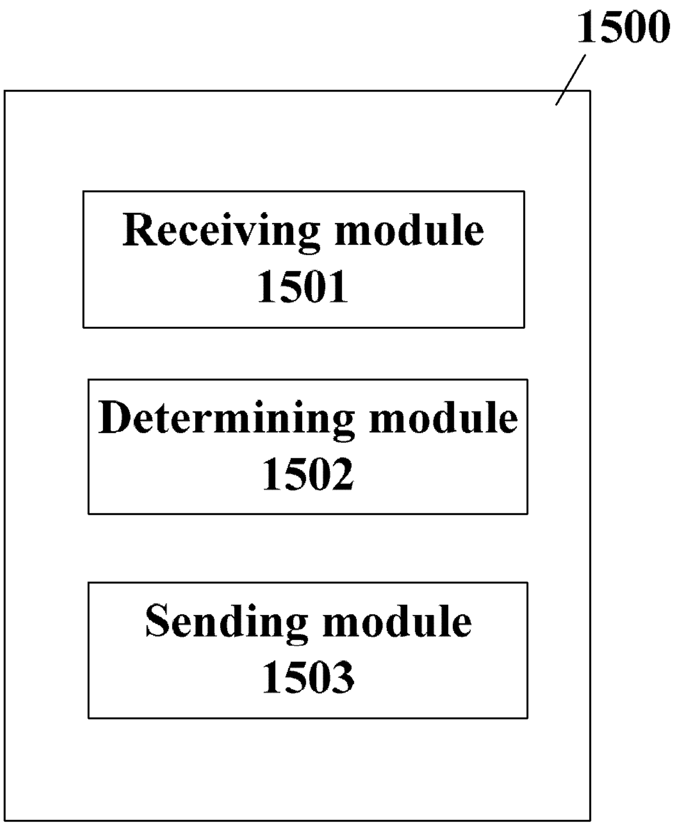
FIG. 15 is a block diagram showing a session management function according to an embodiment of the disclosure.

FIG. 15 is a block diagram showing a session management function according to an embodiment of the disclosure. As shown, the session management function 1500 comprises a receiving module 1501, a determining module 1502 and a sending module 1503. The receiving module 1501 may be configured to receive a first message including fallback information for a terminal device from an access and mobility management function. The fallback information comprises a fallback type. The determining module 1502 may be configured to determine whether data buffering for the terminal device is required based on the fallback information. The sending module 1503 may be configured to, in response to a determination that the data buffering for the terminal device is required, send a second message comprising a buffering indication to a user plane function. The buffering indication indicates the user plane function to buffer the data for the terminal device.

Figure 16:
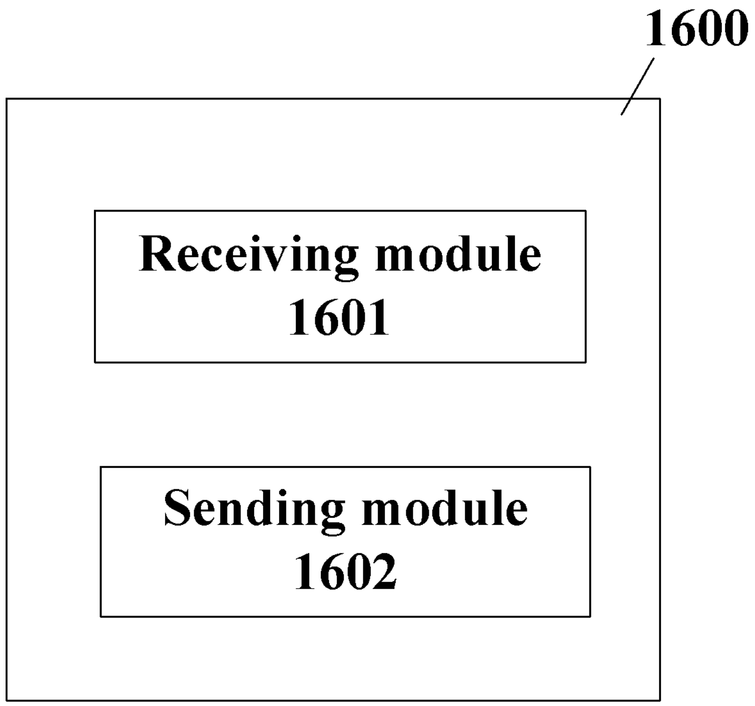
FIG. 16 is a block diagram showing an access and mobility management function according to an embodiment of the disclosure.

FIG. 16 is a block diagram showing an access and mobility management function according to an embodiment of the disclosure. As shown, the access and mobility management function 1600 comprises a receiving module 1601 and a sending module 1602. The receiving module 1601 may be configured to receive a third message including fallback information for a terminal device from a radio access network entity. The fallback information comprises a fallback type. The sending module 1602 may be configured to send a first message including the fallback information for the terminal device to a session management function.

Figure 17:
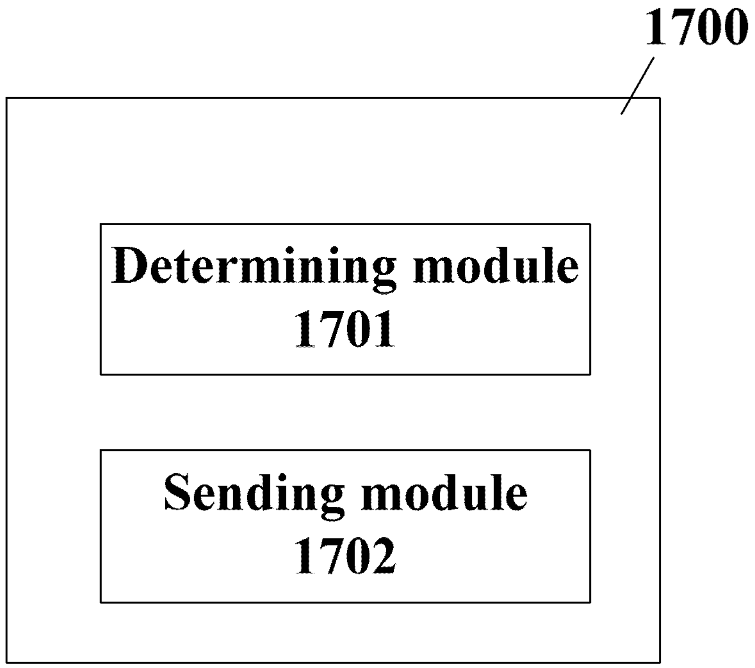
FIG. 17 is a block diagram showing a radio access network entity according to an embodiment of the disclosure.

FIG. 17 is a block diagram showing a radio access network entity according to an embodiment of the disclosure. As shown, the radio access network entity 1700 comprises a determining module 1701 and a sending module 1702. The determining module 1701 may be configured to determine to trigger fallback for a terminal device. The sending module 1702 may be configured to send a third message including fallback information for the terminal device to an access and mobility management function. The fallback information comprises a fallback type.

The term unit or module may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

With function units, the session management function, the access and mobility management function and the radio access network entity described above may not need a fixed processor or memory, any computing resource and storage resource may be arranged from the session management function, the access and mobility management function and the radio access network entity in the communication system. The introduction of virtualization technology and network computing technology may improve the usage efficiency of the network resources and the flexibility of the network.

According to an aspect of the disclosure it is provided a computer program product being tangibly stored on a computer readable storage medium and including instructions which, when executed on at least one processor, cause the at least one processor to carry out any of the methods as described above.

According to an aspect of the disclosure it is provided a computer-readable storage medium storing instructions which when executed by at least one processor, cause the at least one processor to carry out any of the methods as described above.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method performed by a session management function, comprising:

receiving a first message including fallback information for a terminal device from an access and mobility management function, wherein the fallback information comprises an indication of a fallback type comprising at least one of redirection and handover;

determining that data buffering for the terminal device is not required based on the fallback type comprising handover in the received first message;

determining that the data buffering for the terminal device is required based on the indication of the fallback type comprising redirection in the received first message; and in response to a determination that the data buffering for the terminal device is required, sending a second message comprising a buffering indication to a user plane function, wherein the buffering indication indicates that buffering is on for the user plane function to buffer the data for the terminal device.

2. The method according to claim 1, wherein the redirection comprises at least one of:

redirection to a first network from a second network; and redirection to the first network connected to a core network of the second network.

3. The method according to claim 2, wherein the first network comprises an evolved packet system (EPS) and the second network comprises a fifth generation system.

4. The method according to claim 1, wherein the handover comprises at least one of:

handover to a first network from a second network; and handover to the first network connected to a core network of the second network.

5. The method according to claim 1, wherein the fallback comprises at least one of evolved packet system (EPS) fallback or radio access technology, RAT, fallback.

6. The method according to claim 1, wherein the fallback is related to Internet protocol multimedia subsystem (IMS) service.

7. The method according to claim 1, wherein the session management function comprises a packet data network gateway control plane function (PGW-C) combined with the session management function.

8. The method according to claim 1, wherein the first message comprises an Nsmf_PDUSession_UpdateSMContext Request message with N2 PDU Session Resource Modify Response Transfer or PDU Session Resource Modify Unsuccessful Transfer.

9. The method according to claim 1, wherein the second message comprises an N4 Session Modification Request message.

10. The method according to claim 1, wherein the second message is sent during or before an access network release procedure.

11. The method according to claim 10, wherein when the buffering indication is sent before the access network release procedure, the buffering indication has a higher priority than another buffering indication sent during the access network release procedure.

12. A session management function, comprising:

one or more processors; and one or more memories storing computer program codes, the one or more memories and the computer program codes configured to, with the one or more processors, cause the session management function at least to:

receive a first message including fallback information for a terminal device from an access and mobility management function, wherein the fallback information comprises an indication of a fallback type comprising at least one of redirection and handover;

determine that data buffering for the terminal device is not required based on the fallback type comprising handover in the received first message;

determine that the data buffering for the terminal device is required based on the indication of the fallback type comprising redirection in the received first message; and in response to a determination that the data buffering for the terminal device is required, send a second message comprising a buffering indication to a user plane function, wherein the buffering indication indicates that buffering is on for the user plane function to buffer the data for the terminal device.

13. A method performed by a session management function, comprising:

receiving a first message including fallback information for a terminal device from an access and mobility management function, wherein the fallback information comprises an indication of a fallback type comprising at least one of redirection and handover;

determining that data buffering for the terminal device is required based on the indication of the fallback type comprising redirection in the received first message; and in response to a determination that the data buffering for the terminal device is required, sending a second message comprising a buffering indication to a user plane function, wherein the buffering indication indicates that buffering is on for the user plane function to buffer the data for the terminal device, wherein the second message is sent before an access network release procedure and the buffering indication has a higher priority than another buffering indication sent during the access network release procedure.

14. The method according to claim 13, wherein the redirection comprises at least one of:

redirection to a first network from a second network; and redirection to the first network connected to a core network of the second network.

15. The method according to claim 14, wherein the first network comprises an evolved packet system (EPS) and the second network comprises a fifth generation system.

16. The method according to claim 13, wherein the handover comprises at least one of:

handover to a first network from a second network; and handover to the first network connected to a core network of the second network.

17. The method according to claim 13, wherein the fallback comprises at least one of evolved packet system (EPS) fallback or radio access technology, RAT, fallback.

18. The method according to claim 13, wherein the fallback is related to Internet protocol multimedia subsystem (IMS) service.

19. The method according to claim 13, wherein the first message comprises an Nsmf_PDUSession_UpdateSMContext Request message with N2 PDU Session Resource Modify Response Transfer or PDU Session Resource Modify Unsuccessful Transfer.

20. A session management function, comprising:

one or more processors; and one or more memories storing computer program codes, the one or more memories and the computer program codes configured to, with the one or more processors, cause the session management function at least to:

receive a first message including fallback information for a terminal device from an access and mobility management function, wherein the fallback information comprises an indication of a fallback type comprising at least one of redirection and handover;

determine that data buffering for the terminal device is required based on the indication of the fallback type comprising redirection in the received first message; and in response to a determination that the data buffering for the terminal device is required, send a second message comprising a buffering indication to a user plane function, wherein the buffering indication indicates that buffering is on for the user plane function to buffer the data for the terminal device, wherein the second message is sent before an access network release procedure and the buffering indication has a higher priority than another buffering indication sent during the access network release procedure.

* * * * *